(12) United States Patent
Cho et al.

(10) Patent No.: US 12,499,701 B2
(45) Date of Patent: Dec. 16, 2025

(54) DOCUMENT CLASSIFICATION METHOD AND DOCUMENT CLASSIFICATION DEVICE

(71) Applicant: SAMSUNG SDS CO., LTD., Seoul (KR)

(72) Inventors: Sooah Cho, Seoul (KR); Youngjune Gwon, Seoul (KR); Seongho Joe, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 486 days.

(21) Appl. No.: 17/972,931

(22) Filed: Oct. 25, 2022

(65) Prior Publication Data

US 2023/0140444 A1 May 4, 2023

(30) Foreign Application Priority Data

Oct. 29, 2021 (KR) ...................... 10-2021-014 7343

(51) Int. Cl.
*G06V 30/413* (2022.01)
*G06V 10/40* (2022.01)
*G06V 10/762* (2022.01)
*G06V 10/77* (2022.01)
*G06V 10/82* (2022.01)

(52) U.S. Cl.
CPC ............ *G06V 30/413* (2022.01); *G06V 10/40* (2022.01); *G06V 10/762* (2022.01); *G06V 10/7715* (2022.01); *G06V 10/82* (2022.01)

(58) Field of Classification Search
CPC ............... G06V 30/413; G06V 10/762; G06V 10/7715; G06V 10/40; G06V 10/454; G06F 16/35
See application file for complete search history.

(56) References Cited

U.S. PATENT DOCUMENTS

| 10,984,344 | B2 * | 4/2021 | Yamaguchi | G06F 40/279 |
| 2014/0321755 | A1 * | 10/2014 | Iwamoto | G06V 10/462 |
| | | | | 382/197 |
| 2023/0095716 | A1 * | 3/2023 | Jung | G06V 10/82 |
| | | | | 382/156 |
| 2023/0106141 | A1 * | 4/2023 | Kalantidis | G06N 3/084 |
| | | | | 706/15 |

FOREIGN PATENT DOCUMENTS

JP 2021149437 A * 9/2021

OTHER PUBLICATIONS

Espacenet English Translation of JP-2021149437-A Description (Year: 2021).*

* cited by examiner

*Primary Examiner* — Sumati Lefkowitz
*Assistant Examiner* — Anthony J Rodriguez
(74) *Attorney, Agent, or Firm* — Sughrue Mion, PLLC

(57) ABSTRACT

The present disclosure relates to a document classification method and a document classification device. A document classification method performed by a processor inside a computing device according to an embodiment of the present disclosure may include: obtaining a predicted dimension which is a dimension of a feature vector necessary to classify a document image that has been input, through a learned dimension prediction model; generating a feature vector of the document image, through a feature extraction model based on the predicted dimension; and identifying a document type corresponding to the document image on the basis of the generated feature vector.

13 Claims, 15 Drawing Sheets

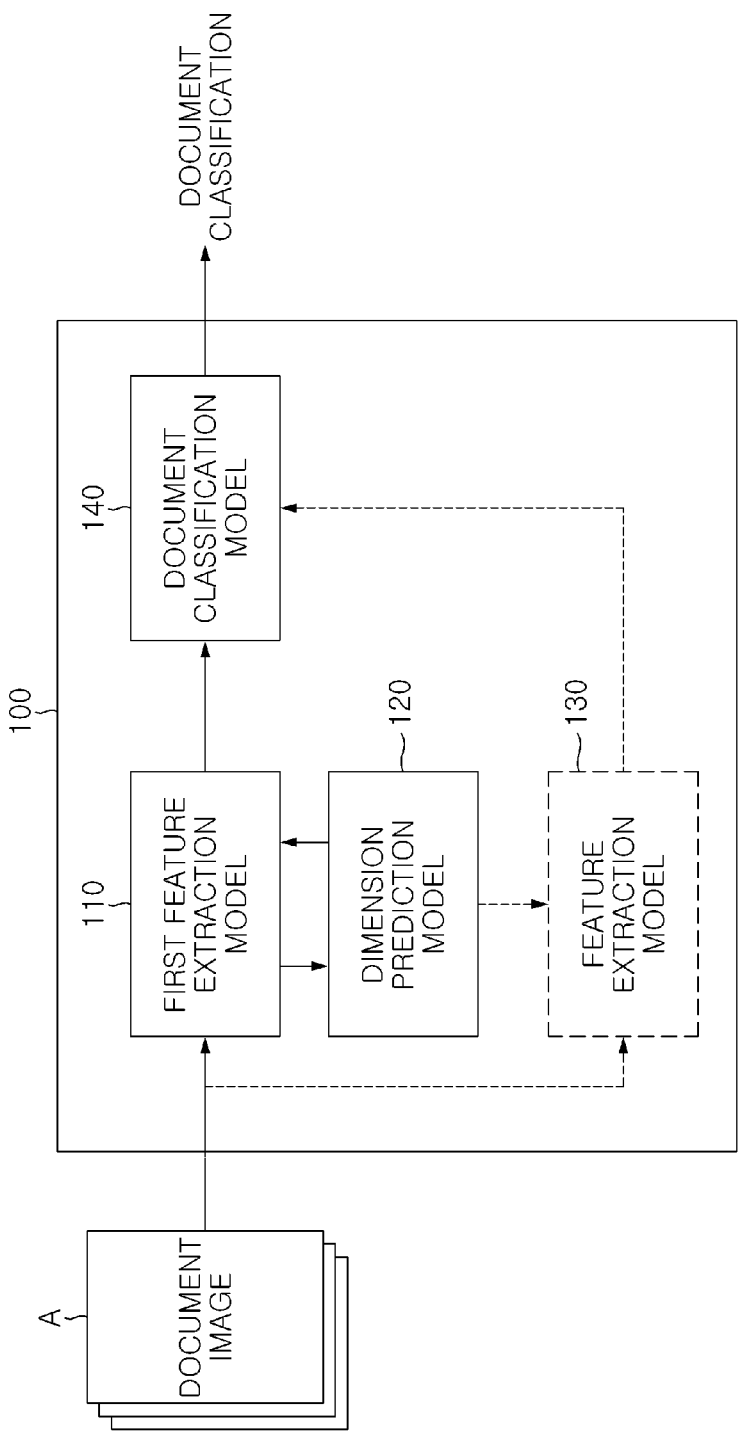

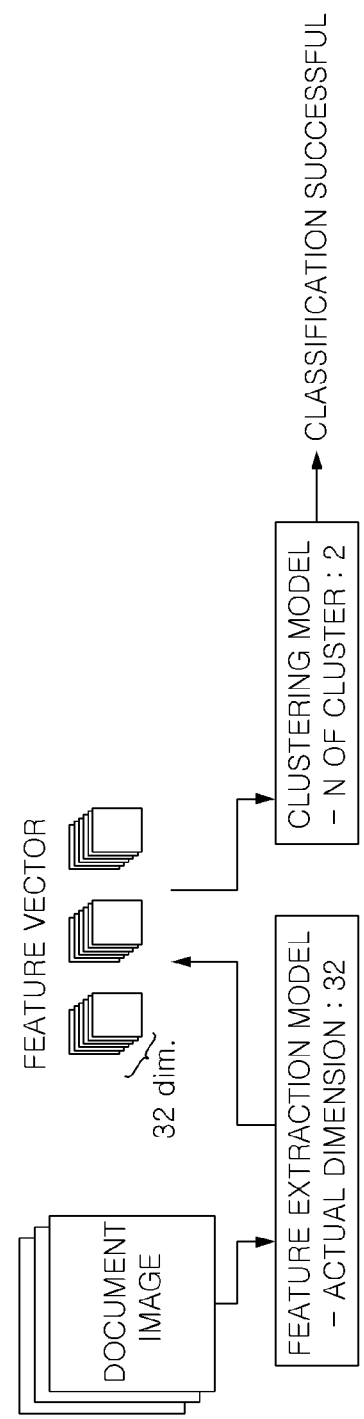

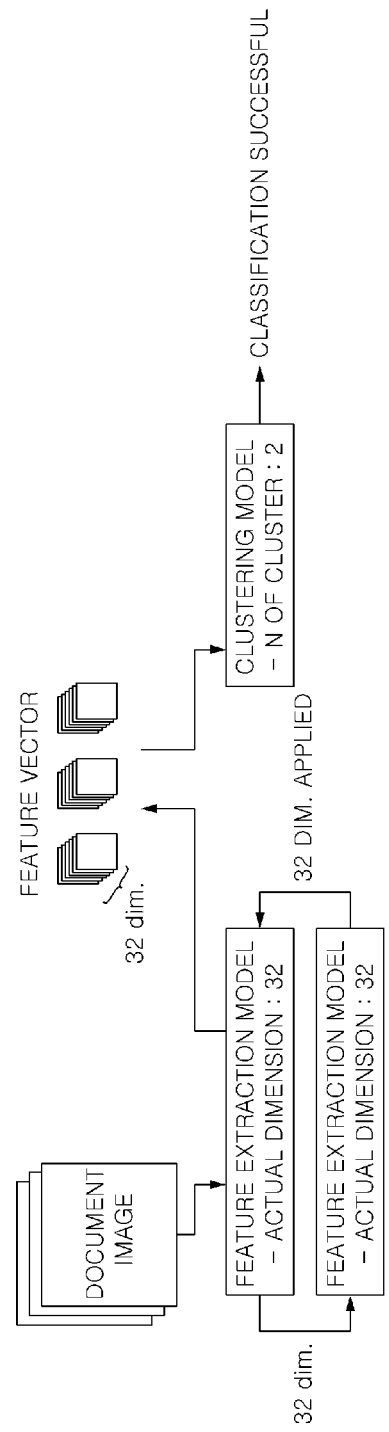

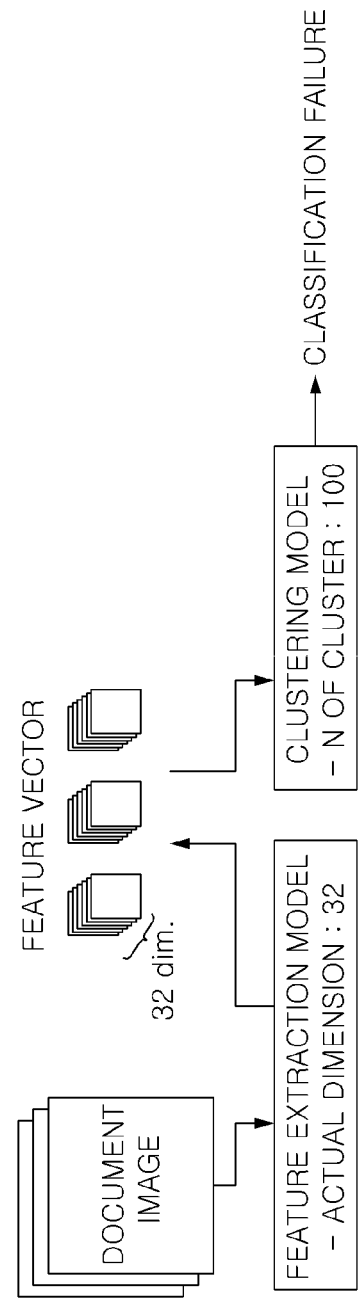

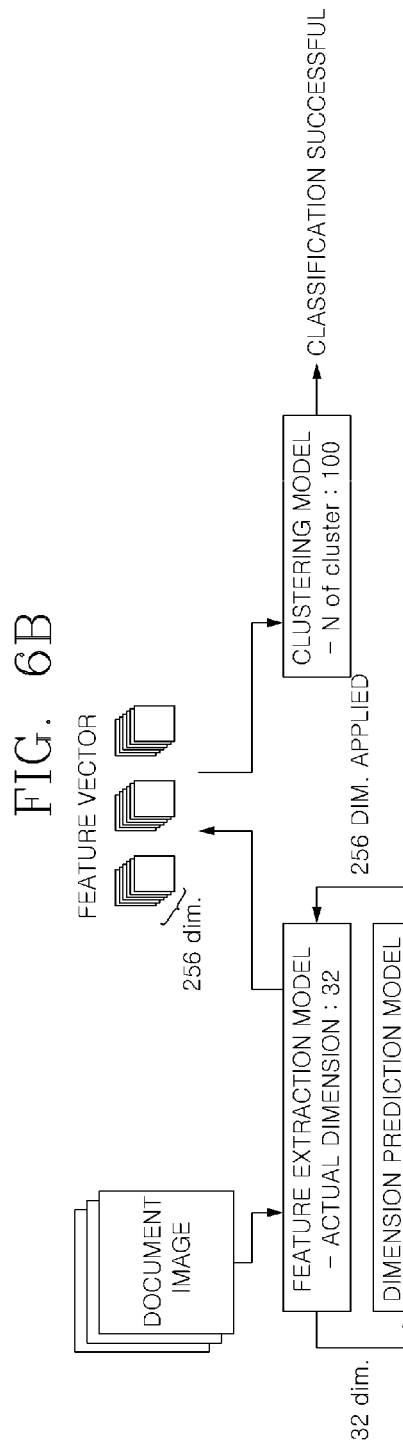

DOCUMENT CLASSIFICATION METHOD AND DOCUMENT CLASSIFICATION DEVICE

CROSS-REFERENCE TO RELATED APPLICATION(S)

This application is based on and claims priority under 35 U.S.C. 119 to Korean Patent Application No. 10-2021-0147343, filed on Oct. 29, 2021, in the Korean Intellectual Property Office, the disclosure of which is herein incorporated by reference in its entirety.

BACKGROUND OF THE INVENTION

1. Field of the Invention

The present disclosure relates to a document classification method and a document classification device and, more particularly, to a document classification method and a document classification device wherein, during document type analysis, the dimension of a feature vector is applied variably such that, even when the type of documents to be classified increases, accurate document classification can be performed.

2. Description of the Prior Art

In general, when a neural network model is used to classify document types, it may be considered to adopt a scheme in which a fully connected (FC) layer regarding N document types is coupled to a feature extraction model, thereby performing classification. This scheme has a problem in that, although N document types can be accurately classified, the entire neural network model needs to be relearned if the document types to be classified increase, thereby requiring additional operations.

As another embodiment, it may be considered to cluster and classify feature vectors generated by a feature extraction model according to the degree of similarity. According to this scheme, no FC layer is added to the feature extraction model, and feature vectors of the feature extraction model are clustered and classified by k-mean clustering or the like. In this case, the number of document types to be classified is not fixed, and document classification is possible even if document types to be classified increase.

However, the feature extraction model generates feature vectors of a fixed dimension, and if the number of document clusters to be analyzed increases continuously, the feature vectors of a fixed dimension may fail to provide sufficient information necessary for the clusters. For example, when classifying ten types of documents, feature vectors of 1024 dimensions may provide sufficient information, but when classifying 1000 types of documents, feature vectors of 1024 dimensions may be insufficient.

SUMMARY OF THE INVENTION

The present disclosure may provide a document classification method and a document classification device wherein the dimension of a feature vector is changed adaptively such that, even when the type of documents to be classified increases, the accuracy of document classification can be maintained.

The present disclosure may provide a document classification method and a document classification device wherein it can be determined whether the dimension of a feature vector for document classification is insufficient, and when it is determined that the dimension of a feature vector is insufficient, a feature extraction model can be modified to expand the dimension of the feature vector.

The present disclosure may provide a document classification method and a document classification device wherein, when learning a dimension prediction model for predicting the dimension of a feature vector necessary for document classification, the dimension prediction model can be learned without a labeled sheet regarding the necessary dimension.

A document classification method performed by a processor inside a computing device according to an embodiment of the present disclosure may include: obtaining a predicted dimension which is a dimension of a feature vector necessary to classify a document image that has been input, through a learned dimension prediction model; generating a feature vector of the document image, through a feature extraction model based on the predicted dimension; and identifying a document type corresponding to the document image on the basis of the generated feature vector.

The obtaining of a predicted dimension may include: generating a first feature vector regarding the document image by inputting the input document image to a first feature extraction model; and obtaining the predicted dimension by inputting the first feature vector to the dimension prediction model.

In the generating of a feature vector, when the dimension of the first feature vector is smaller than the predicted dimension, the feature vector of the document image may be generated through a feature extraction model based on the predicted dimension.

The generating of a feature vector may further include: modifying a final layer of the first feature extraction model so as to further include a dimension corresponding to a difference between the dimension of the first feature vector and the predicted dimension; and generating a feature extraction model based on the predicted dimension by fine-tuning a weight of the final layer.

In the generating of a feature vector, if the dimension of the first feature vector is equal to or larger than the predicted dimension, the feature vector of the document image may be generated by using the first feature extraction model as a feature extraction model based on the predicted dimension.

In the identifying of a document type, a clustering model may be used as a document classification model, and the feature vector may be input to the clustering model so as to identify a document type corresponding to the document image from a cluster including the feature vector.

The document classification method according to an embodiment of the present disclosure may further include learning and generating the dimension prediction model on the basis of a neural network model.

The generating of the dimension prediction model may include: inputting a learning data set including multiple learning images to the first feature extraction model, thereby generating a learning vector corresponding to the learning images; inputting the learning vectors to the dimension prediction model, thereby obtaining a predicted dimension which is a dimension of a learning vector necessary to classify learning images included in the learning data set; and learning so as to minimize loss of the predicted dimension and a labeled dimension, thereby generating the dimension prediction model.

The learning of the dimension prediction model may include: inputting a learning data set including multiple learning images to the first feature extraction model, thereby generating first learning vectors corresponding to the learning images; inputting the first learning vectors to the dimension prediction model, thereby obtaining a predicted dimension which is a dimension of a learning vector necessary to classify learning images included in the learning data set; modifying a final layer of the first feature extraction model so as to generate a feature vector having the predicted dimension, and generating a feature extraction model by fine-tuning a weight of the final layer; inputting the learning data set to the feature extraction model, thereby generating multiple second learning vectors; inputting the second learning vectors to a clustering model, thereby classifying the second learning vectors into multiple clusters, and obtaining a predicted cluster number which is the number of the classified clusters; and learning so as to minimize loss of the predicted cluster number and a labeled cluster number of the learning data set, thereby generating the dimension prediction model.

In connection with a computer-readable storage medium storing commands which, when executed by a processor, cause a device including the processor to perform document classification operations according to an embodiment of the present disclosure, the operations may include: obtaining a predicted dimension which is a dimension of a feature vector necessary to classify a document image that has been input, through a learned dimension prediction model; generating a feature vector of the document image, through a feature extraction model based on the predicted dimension; and identifying a document type corresponding to the document image on the basis of the generated feature vector.

The obtaining of a predicted dimension may include: generating a first feature vector regarding the document image by inputting the document image to a first feature extraction model; and obtaining the predicted dimension by inputting the first feature vector to the dimension prediction model.

In connection with a document classification device including a processor according to an embodiment of the present disclosure, the processor may perform: obtaining a predicted dimension which is a dimension of a feature vector necessary to classify a document image that has been input, through a learned dimension prediction model; generating a feature vector of the document image, through a feature extraction model based on the predicted dimension; and identifying a document type corresponding to the document image on the basis of the generated feature vector.

The obtaining of a predicted dimension may include: generating a first feature vector regarding the document image by inputting the document image to a first feature extraction model; and obtaining the predicted dimension by inputting the first feature vector to the dimension prediction model.

In the generating of a feature vector, when the dimension of the first feature vector is smaller than the predicted dimension, the feature vector of the document image may be generated through a feature extraction model based on the predicted dimension.

The generating of a feature vector may further include: modifying a final layer of the first feature extraction model so as to further include a dimension corresponding to a difference between the dimension of the first feature vector and the predicted dimension; and generating a feature extraction model based on the predicted dimension by fine-tuning a weight of the final layer.

In the generating of a feature vector, if the dimension of the first feature vector is equal to or larger than the predicted dimension, the feature vector of the document image may be generated by using the first feature extraction model as a feature extraction model based on the predicted dimension.

In the identifying of a document type, a clustering model may be used as a document classification model, and the feature vector may be input to the clustering model so as to identify a document type corresponding to the document image from a cluster including the feature vector.

The document classification device according to an embodiment of the present disclosure may further include learning and generating the dimension prediction model on the basis of a neural network model.

The generating of the dimension prediction model may include: inputting a learning data set including multiple learning images to the first feature extraction model, thereby generating a learning vector corresponding to the learning images; inputting the learning vectors to the dimension prediction model, thereby obtaining a predicted dimension which is a dimension of a learning vector necessary to classify learning images included in the learning data set; and learning so as to minimize loss of the predicted dimension and a labeled dimension, thereby generating the dimension prediction model.

The generating of the dimension prediction model may include: inputting a learning data set including multiple learning images to the first feature extraction model, thereby generating first learning vectors corresponding to the learning images; inputting the first learning vectors to the dimension prediction model, thereby obtaining a predicted dimension which is a dimension of a learning vector necessary to classify learning images included in the learning data set; modifying a final layer of the first feature extraction model so as to generate a feature vector having the predicted dimension, and generating a feature extraction model by fine-tuning a weight of the final layer; inputting the learning data set to the feature extraction model, thereby generating multiple second learning vectors; inputting the second learning vectors to a clustering model, thereby classifying the second learning vectors into multiple clusters, and obtaining a predicted cluster number which is the number of the classified clusters; and learning so as to minimize loss of the predicted cluster number and a labeled cluster number of the learning data set, thereby generating the dimension prediction model.

In addition, the above-mentioned technical solutions do not enumerate all features of the present disclosure. Various features of the present disclosure and advantageous effects resulting therefrom will be understood more clearly from the following detailed embodiments.

A document classification method and a document classification device according to an embodiment of the present disclosure can adaptively change the dimension number of feature vectors such that, even when the type of documents to be classified increases, document classification can be performed adaptively.

A document classification method and a document classification device according to an embodiment of the present disclosure can determine whether the dimension of a feature vector for document classification is insufficient, and when it is determined that the dimension of a feature vector is insufficient, a feature extraction model can be modified to expand the dimension of the feature vector, thereby performing accurate document classification.

According to a document classification method and a document classification device according to an embodiment of the present disclosure, a dimension prediction model can be learned even without a labeled sheet regarding the dimension number of feature vectors necessary for document classification. That is, human operations are necessary to obtain the correct dimension number regarding respective learning images, but a document classification method and a document classification device according to an embodiment of the present disclosure can easily learn a dimension prediction model by using clustering loss.

However, advantageous effects obtainable by document classification methods and document classification devices according to embodiments of the present disclosure are not limited to the above-mentioned advantageous effects, and other advantageous effects not mentioned herein will be clearly understood from the following description by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which:

FIG. 1 is a block diagram illustrating a document classification device according to an embodiment of the present disclosure;

FIG. 5A and FIG. 5B schematically illustrate operations of a document classification device according to an embodiment of the present disclosure;

FIG. 6A and FIG. 6B schematically illustrate operations of a document classification device according to an embodiment of the present disclosure;

DETAILED DESCRIPTION OF THE EXEMPLARY EMBODIMENTS

Figure 2A:
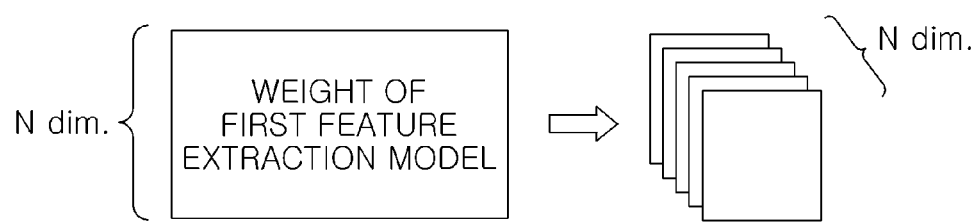
FIG. 2A and FIG. 2B schematically illustrate generation of a feature extraction model according to an embodiment of the present disclosure.

Hereinafter, embodiments disclosed in this specification will be described in detail with reference to the accompanying drawings. Objectives, peculiar advantageous, and novel features of the present disclosure will become clearer from following descriptions and exemplary embodiments taken together with the accompanying drawings.

Terms or words used in this specification and the claims correspond to concepts defined appropriately by inventors to best describe the disclosure, are to be interpreted as having meanings and concepts conforming to the technical idea of the present disclosure, are given only to describe embodiments, and are not to be interpreted as limiting the present disclosure.

In connection with assigning reference numerals to components, identical or similar components will be given identical reference numerals, and repeated descriptions thereof will be omitted herein. Suffixes "module" and "unit" regarding components used in the following description are assigned or used interchangeably such that the specification can be composed easily, do not have meanings or roles distinguished from each other per se, and may denote software or hardware components.

In connection with describing components of the present disclosure, a component expressed in a singular form is to be understood as including a plural form of the component unless otherwise specified. In addition, terms such as "first", "second", and the like are used to distinguish a component from another component, and the component is not limited by such terms. In addition, the description that a component is connected to another component includes the possibility that another component may be connected between the two components.

In addition, in connection with describing embodiments disclosed in this specification, detailed descriptions regarding relevant known arts may be omitted when it is determined that such descriptions may obscure the gist of embodiments disclosed in this specification. In addition, the accompanying drawings are only for facilitating understanding of embodiments disclosed in this specification, and do not limit the technical idea disclosed in this specification, which is to be understood as including all changes, equivalents, and replacements falling within the idea and technical scope of the present disclosure.

FIG. 1 is a block diagram illustrating a document classification device according to an embodiment of the present disclosure.

Referring to FIG. 1, the document classification device 100 according to an embodiment of the present disclosure may include a first feature extraction model 110, a dimension prediction model 120, a feature extraction model 130, and a document classification model 140. The document classification device 100 or respective models 110-140 constituting the same may be implemented through the computing device illustrated in FIG. 13.

The document classification device 100 according to an embodiment of the present disclosure will now be described with reference to FIG. 1.

The first feature extraction model 110 may generate a first feature vector regarding a document image A that has been input thereto. The first feature extraction model 110 may be implemented as a neural network model such as a convolutional neural network (CNN), and may be configured to include, for example, a convolution layer, a pooling layer, a fully connected (FC) layer, and an activation function.

Various features (for example, formats and texts) included in the document image A may be expressed as multiple dimensions included in a first feature vector. The number of dimensions included in a single first feature vector may be determined by respective nodes inside the neural network of the first feature extraction model 110. That is, the dimension number of a first feature vector generated by the first feature extraction model 110 may be identically maintained as along as the neural network structure of the first feature extraction model 110 remains unchanged.

The dimension prediction model 120 may receive the first feature vector from the first feature extraction model 110, and may use the first feature vector to obtain a predicted dimension, which is the dimension of a feature vector necessary to classify the document image A.

When a small number of types of documents are to be classified by the document classification device 100, documents can be classified by distinguishing features of respective documents even with a small number of dimensions of a feature vector. However, if the type of documents to be classified increases, it is impossible to identify detailed features of each document image A solely with a small number of dimensions of a feature vector, and the accuracy of document classification may thus be degraded.

In order to prevent this, it is necessary to confirm in advance whether the dimensions of a feature vector are sufficient to classify documents, and if it is then confirmed that dimensions are insufficient, it is necessary to make adjustments such that a feature vector having more dimensions is generated. In this regard, the dimension prediction model 120 may be used to obtain a predicted dimension, which is a dimension necessary for document classification, and which may be used to confirm whether the dimension included in the first feature vector is sufficient for document classification.

That is, if the predicted dimension is larger than the actual dimension included in the first feature vector, it may be confirmed that the first feature vector is insufficient for document classification. If the predicted dimension is equal to the actual dimension, or if the actual dimension is larger, it may be confirmed that the first feature vector is sufficient for document classification.

The feature extraction model 130 is configured to generate a feature vector regarding a document image A that has been input, and may be implemented as a neural network model (for example, CNN). As illustrated in FIG. 1, the feature extraction model 130 may be applied as long as the predicted dimension is larger than the actual dimension included in the first feature vector. The feature extraction model 130 may generate a feature vector having the same dimension as the predicted dimension, and may be generated, in some embodiments, as long the actual dimension included in the first feature vector is smaller than the predicted dimension. That is, the feature extraction model 130 may be generated if it is confirmed by the dimension prediction model 120 that the dimension of the first feature vector is insufficient for document classification, and may be generated, in this case, by modifying the first feature extraction model 110.

Particularly, the final layer of the first feature extraction model 130 may be modified such that the feature vector further includes dimensions corresponding to the difference between the predicted dimension and the actual dimension, and the weight of the final layer may then be determined through fine tuning.

Figure 2B:
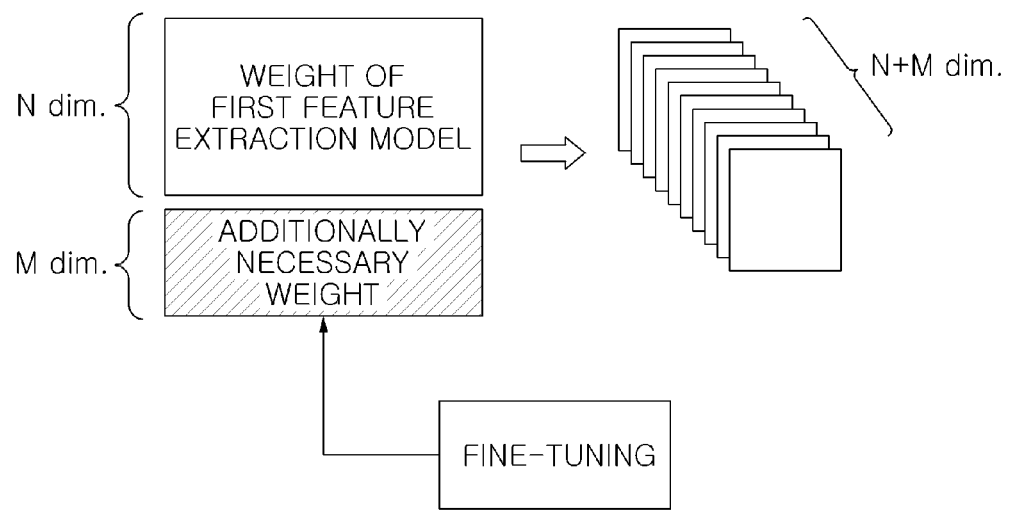

For example, as illustrated in FIG. 2A and FIG. 2B, if the actual dimension of the first feature vector is N, and the predicted dimension is N+M (N and M are natural numbers), the feature extraction model 130 may generated N dimensions with the neural network of the first feature extraction model 110, and may add nodes of the final layer such that remaining M dimensions are further generated. Fine tuning may then be conducted such that tasks such as rotation detection and noise removal, configured by the user, are performed only with regard to the added nodes, thereby learning the weight of the added nodes. As a result, additional learning for generating the feature extraction model 130 may be minimized while maximizing use of the already learned first feature extraction model 110. The tasks for fine tuning may be implemented by self-supervised learning. Additionally, in some embodiments, it is possible to perform fine tuning with regard to all layers, without being limited to determining weights through fine turning with regard to the final layer.

It has been assumed in the above description that the feature extraction model 130 is generated by modifying the first feature extraction model 110. However, in some embodiments, it is possible to generate multiple feature extraction models for generating feature vectors having various dimensions in advance, and then to select a feature extraction model according to the predicted dimension.

The document classification model 140 may identify the document type corresponding each document image A by using a feature vector that has been input thereto. The feature vector may be received from the first feature extraction model 110 or from the feature extraction model 130. That is, if the actual dimension is smaller than the predicted dimension, a feature vector having the predicted dimension may be input from the feature extraction model 130, and if the actual dimension is equal to or larger than the predicted dimension, the first feature vector may be input from the first feature extraction model 110.

The document classification model 140 may be a clustering model. Feature vectors may be input to the clustering model to identify the document type corresponding to a document image from a cluster including each feature vector. Therefore, clusters may be separately formed according to the degree of similarity between respective feature vectors, and document images A corresponding to feature vectors included in the same cluster may be classified as corresponding to the same document type.

Meanwhile, the dimension prediction model 120 may be implemented on the basis of a neural network model such as a recurrent neural network (RNN) or perceptron, and the dimension prediction model 120 may be generated by learning based on the neural network model.

Figure 3:
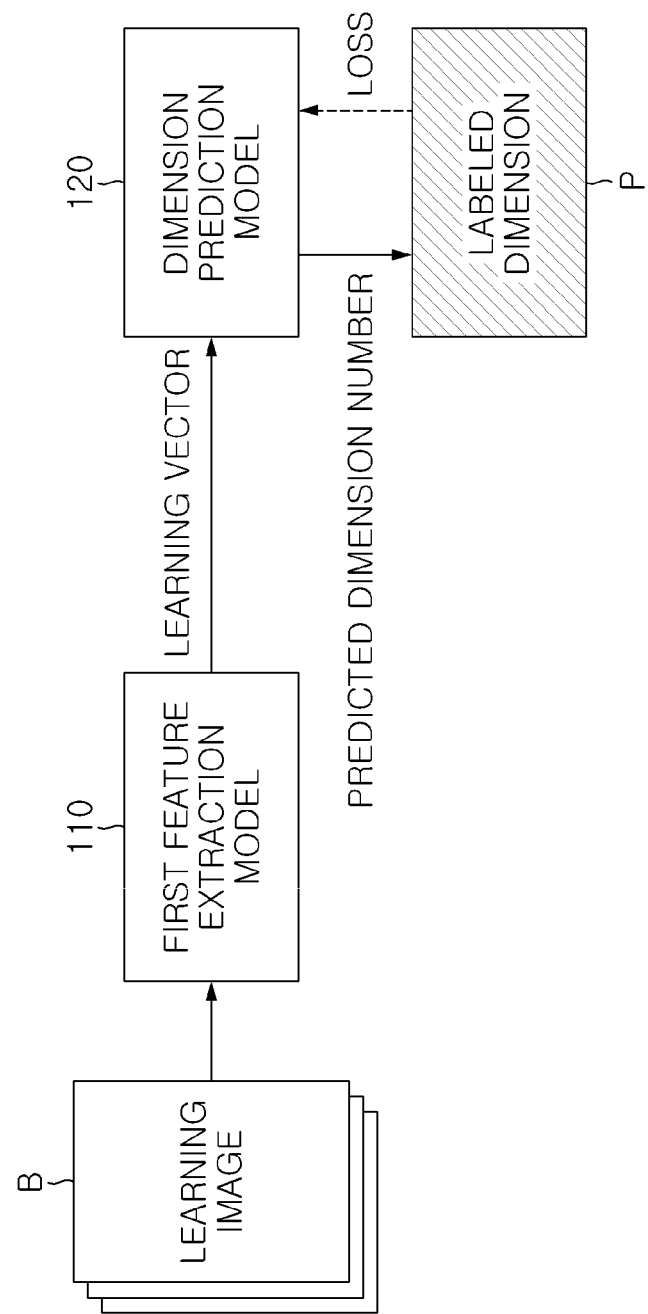
FIG. 3 schematically illustrates learning of a dimension prediction model according to an embodiment of the present disclosure.

According to an embodiment, as illustrated in FIG. 3, the dimension prediction model 120 may be learned on the basis of a heuristic labeled sheet. Particularly, a learning data set including multiple learning images B may be input to the first feature extraction model 110. The first feature extraction model 110 may generate learning vectors corresponding to the learning images B. On the basis of the learning vectors that have been input thereto, the dimension prediction model 120 may obtain a predicted dimension, which is the dimension of learning vectors necessary to classify the learning images B included in the learning data set. The predicted dimension may be compared with a labeled dimension P for classifying an actual learning data set, and a dimension prediction model may be generated through learning that minimizes loss of the predicted dimension and the labeled dimension P. In this case, the loss may be directly calculated by using the labeled dimension P, but the user or the like needs to generate the labeled dimension P heuristically in advance by considering each learning vector and the number of document types to be classified.

Figure 4:
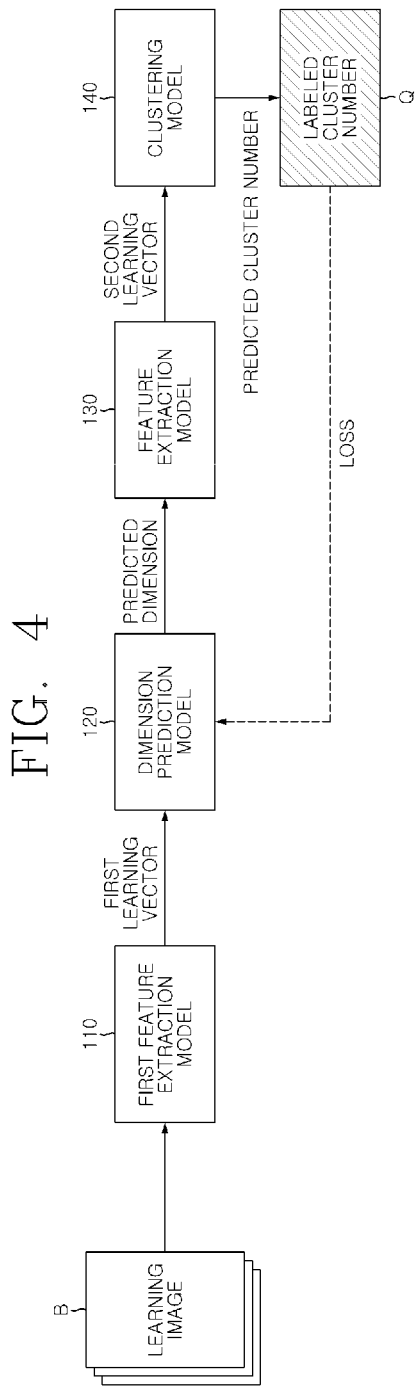
FIG. 4 schematically illustrates learning of a dimension prediction model according to another embodiment of the present disclosure.

According to another embodiment of the present disclosure, it is also possible to learn the dimension prediction model 120 through automatic learning, as illustrated in FIG. 4. Particularly, a learning data set including multiple learning images B may be input to the first feature extraction model 110, thereby generating first learning vectors corresponding to the learning images B. the dimension prediction model 120 may then receive the first learning vectors input thereto, and may use the first learning vectors so as to obtain a predicted dimension, which is the dimension of first learning vectors necessary to classify the learning images B included in the learning data set.

After obtaining the predicted dimension, a feature extraction model 130 may be generated to generate a feature vector having the predicted dimension, and the feature extraction model 130 may be generated by modifying the first feature extraction model 110 in this case. That is, the feature extraction model 130 may be generated by modifying the final layer of the first feature extraction model 110 and then fine-tuning the weight of the final layer.

A learning data set may then be input to the feature extraction model 130, thereby generating multiple second learning vectors, and the second learning vectors may be input to a clustering model 140, thereby classifying the second learning vectors into multiple clusters. Respective clusters correspond to individual document types, and a predicted cluster number may thus be obtained by counting the number of clusters into which the second learning vectors have been classified.

The predicted cluster number and a labeled cluster number Q regarding learning data sets may be compared. A dimension prediction model for obtaining an accurate predicted dimension may be generated through learning that minimizes loss of the predicted cluster number and the labeled cluster number Q.

In some embodiments, loss may be configured by considering a distance loss together with the clustering loss during dimension prediction model learning. The distance loss corresponds to a center distance between clusters, and the clustering loss corresponds to a difference between the labeled cluster number Q and the predicted cluster number. Therefore, a dimension prediction model may be learned by designing the loss to be low when the center distance between clusters is large, together with a predicted small difference from the labeled cluster number, and to be high when the center distance between clusters is small, together with a predicted large difference from the labeled cluster number.

In this case, the loss may be configured as follows:

$$\text{Loss} = \text{Distance Loss} + \text{Clustering Loss}$$

$$\text{Distance Loss} = \sum_{i,j \in Cluster} \text{Mahalanobis } Dist.(i, j)$$

$$\text{Distance Loss} = \sum_{i,j \in Cluster} \text{Mahalanobis } Dist.(i, j)$$

wherein the distance loss is the sum of Mahalanobis distances between respective clusters, and the clustering loss corresponds to the square of a difference between the precited cluster number (n of predicted cluster) and the labeled cluster number (n of labeled cluster).

FIG. 5A and FIG. 5B schematically illustrate operations of a document classification device according to an embodiment of the present disclosure. FIG. 6A and FIG. 6B schematically illustrate operations of a document classification device according to an embodiment of the present disclosure.

In the case of FIG. 5, two types of documents are to be classified (N of cluster: 2), and the actual dimension of a feature vector generated by a feature extraction model with regard to a document image A may be 32. In this case, as illustrated in FIG. 5A, even a conventional document classification device can perform classification by inputting a feature vector to a clustering model, and it is possible to actually classify documents into two cluster.

FIG. 5B illustrates a case in which a document classification device according to an embodiment of the present disclosure is used. If a feature extraction model generates a feature vector, a dimension prediction model may predict the dimension necessary for classification, thereby obtaining a predicted dimension. Since predicted dimension and the actual dimension are both 32 in this case, a feature vector generated by an existing feature extraction model may be input to a clustering model, and the clustering model may then classify documents into two clusters.

FIG. 6A and FIG. 6B correspond to a case in which the type of documents to be classified has increased to 100. As illustrated in FIG. 6A, a conventional document classification device uses a feature vector having 32 dimensions generated by an existing feature extraction model. However, 100 document types cannot be identified in this case only with 32 dimensions, and the conventional document classification device thus fails in document classification.

On the other hand, in the case of a document classification device according to an embodiment of the present disclosure may, as illustrated in FIG. 6B, a dimension prediction model may predict the dimension of a feature vector necessary to classify 100 documents from a feature vector of a feature extraction model. Accordingly, it may be confirmed that the current dimension of the feature vector is insufficient to classify 100 document types. Therefore, the document classification device may modify the feature extraction model such that, instead of 32 dimensions, 256 dimensions are generated. A feature vector including 256 dimensions may then be input to a clustering model, and the clustering model may classify 100 types by using the feature vector having 256 dimensions.

As such, a document classification device according to an embodiment of the present disclosure can predict the dimension necessary for document classification such that the dimension of a feature vector is applied variably. Therefore, documents can be accurately classified even if the document types to be classified increase.

Figure 7:
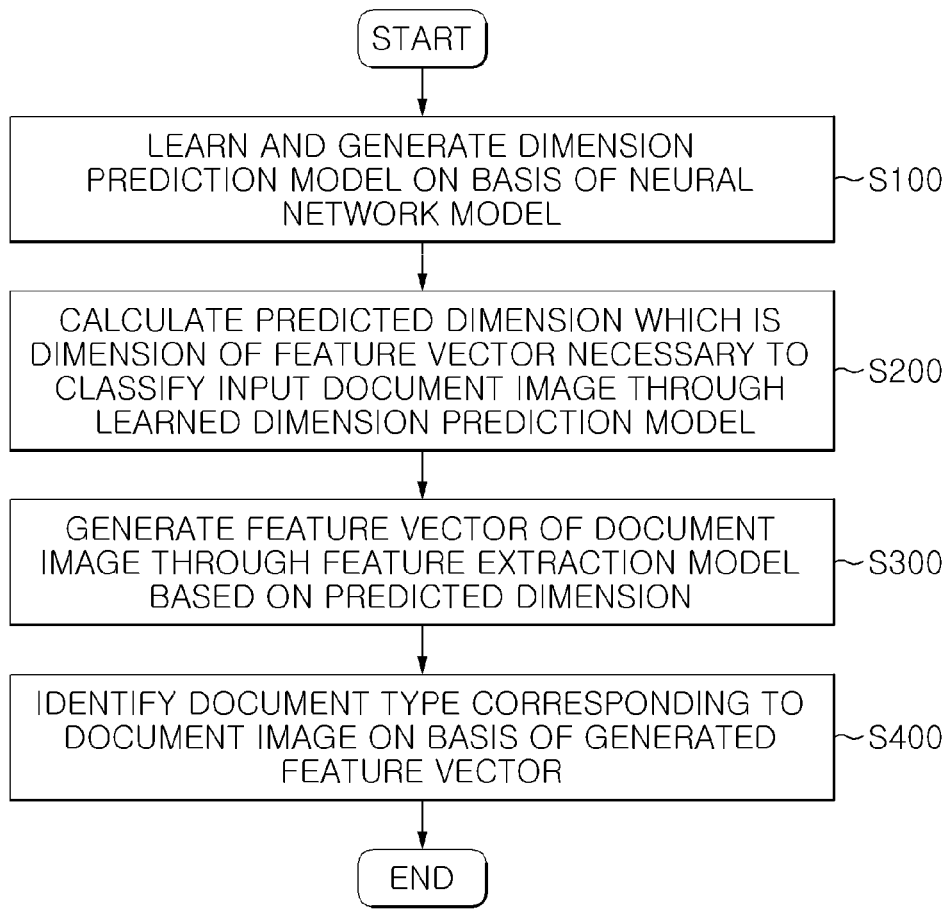
FIG. 7 is a flowchart illustrating a document classification method according to an embodiment of the present disclosure.

FIG. 7 is a flowchart illustrating a document classification method according to an embodiment of the present disclosure. Respective steps of the document classification method may be performed by the document classification device 100 or the computing device 12 illustrated in FIG. 1 and/or FIG. 13 and described with reference to these drawings.

Referring to FIG. 7, the computing device may learn and generate a dimension prediction model on the basis of a neural network model (S100). That is, according to an embodiment of the present disclosure, a dimension prediction model for predicting the dimension of a feature vector necessary to classify a document image needs to be learned in advance. The dimension prediction model may be learned by using a heuristic learning method in which a labeled dimension is used, or an automatic learning method in which a clustering loss is used.

Figure 8:
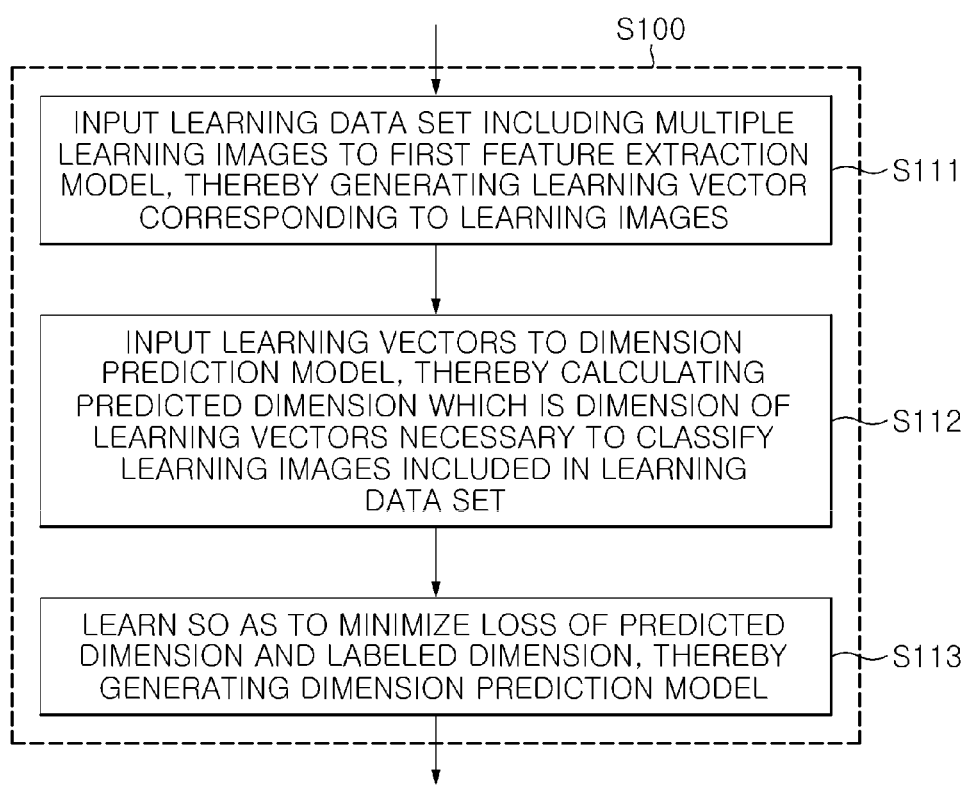
FIG. 8 is a flowchart illustrating a more detailed embodiment of learning and generating the dimension prediction model on the basis of a neural network model (S100) in FIG. 7.

FIG. 8 is a flowchart illustrating a method for learning a dimension prediction model by using a labeled dimension. Referring to FIG. 8, a computing device may input a learning data set including multiple learning images to a first feature extraction model, thereby generating learning vectors corresponding to the learning images (S111). The computing device may then input the learning vectors to a dimension prediction model, thereby obtaining a predicted dimension, which is a dimension of learning vectors necessary to classify the learning images included in the learning data set (S112). The predicted dimension may be compared with a labeled dimension for classifying an actual learning data set, and the computing device may learn so as to minimize the loss of the predicted dimension and the labeled dimension, thereby generating a dimension prediction model (S113). That is, when the labeled dimension is used, it is possible to directly calculate losses related to the predicted dimension and the labeled dimension, but a person needs to heuristically generate the labeled dimension in person.

Figure 9:
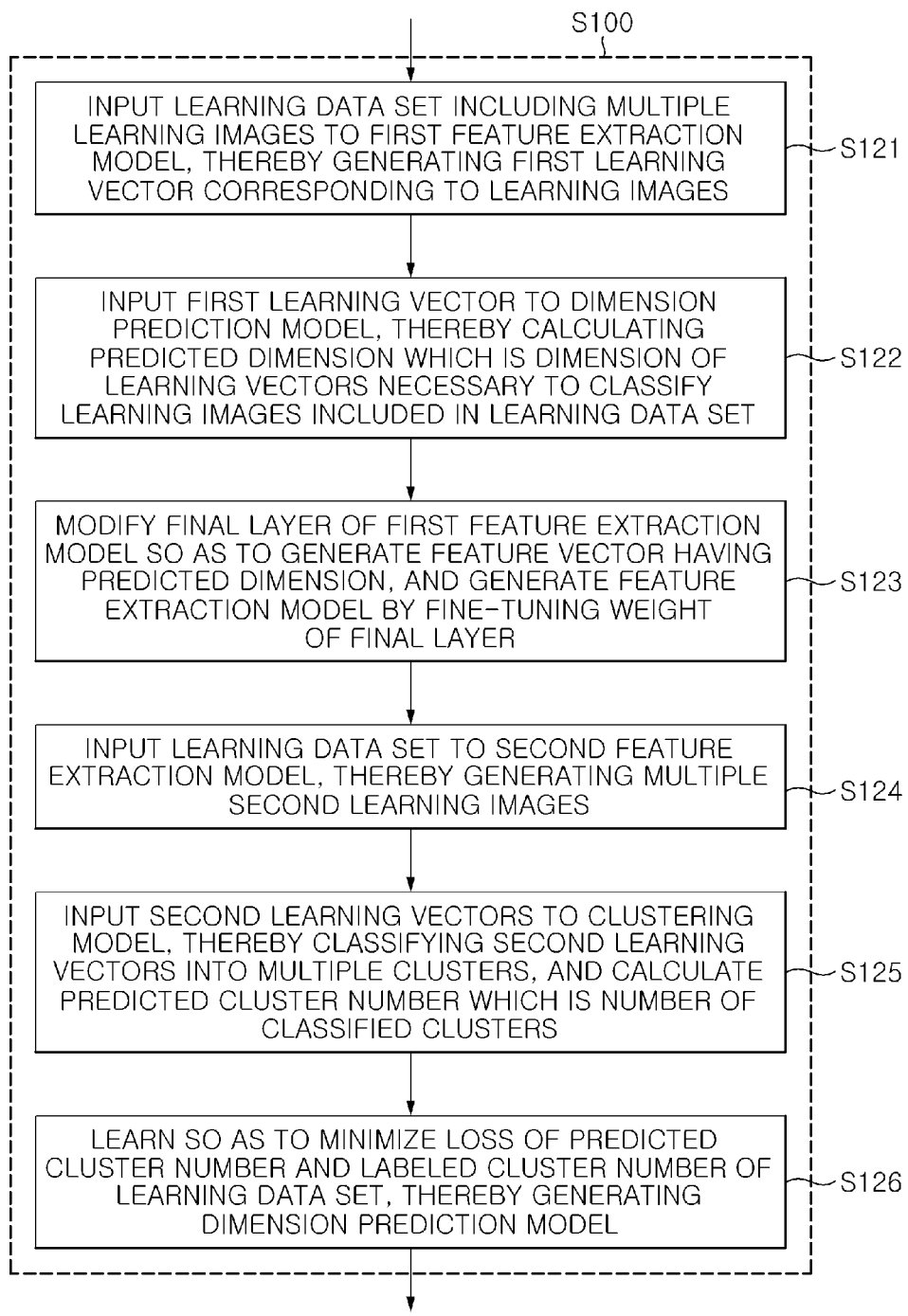
FIG. 9 is a flowchart illustrating another more detailed embodiment of learning and generating the dimension prediction model on the basis of a neural network model (S100) in FIG. 7.

FIG. 9 is a flowchart illustrating a method for automatically learning a dimension prediction model by using a clustering loss. Referring to FIG. 9, a computing device may input a learning data set including multiple learning images to a first feature extraction model, thereby generating first learning vectors (S121). The computing device may then input the first learning vectors to a dimension prediction model, thereby obtaining a predicted dimension (S122), and may modify the final layer of the first feature extraction model and fine-tune the weight of the final layer such that a feature vector having the predicted dimension is generated, thereby generating a feature extraction model (S123).

The computing device may then input the learning data set to the feature extraction model, thereby generating multiple second learning vectors (S124), may input the second learning vectors to a clustering model, thereby classifying the second learning vectors into multiple clusters, and may obtain a predicted cluster number, which is the number of the classified clusters (S125).

The computing device may then compare the predicted cluster number with a labeled cluster number regarding the learning data set, and may learn so as to minimize the loss of the predicted cluster number and the labeled cluster number of the learning data set, thereby generating a dimension prediction model (S126). That is, in the case of FIG. 9, it is possible to learn a dimension prediction model only if the labeled cluster number of learning data sets is secured.

Figure 10:
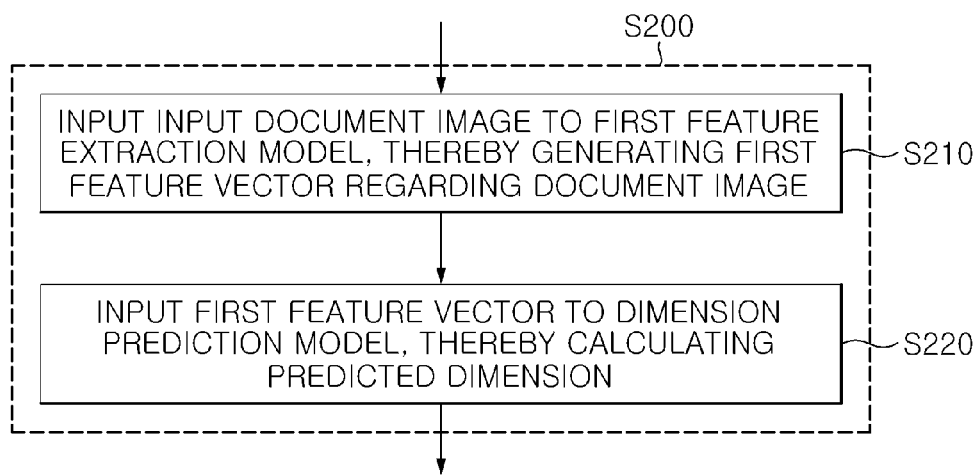
FIG. 10 is a flowchart illustrating a more detailed embodiment of obtaining a predicted dimension, which is a dimension of a feature vector necessary to classify a document image that has been input, through a learned dimension prediction model (S200) in FIG. 7.

After generating the dimension prediction model, the computing device may obtain a predicted dimension, which is the dimension of a feature vector necessary to classify the document image that has been input, through the learned dimension prediction model (S200). Particularly, referring to FIG. 10, the computing device may input a document image to a first feature extraction model, thereby generating a first feature vector regarding the document image (S210). That is, in order to classify document images, features of the document images need to be extracted, and the computing device may thus extract features inside a document image with the first feature extraction model, thereby generating a first feature vector. The first feature extraction model may generate the first feature vector so as to include multiple dimensions such that the first feature vector expresses various features (for example, formats or texts) inside the document image. The first feature extraction model may be implemented as a neural network model (for example, CNN), and the number of dimensions included in the first feature vector may be determined by the neural network structure of the first feature extraction model. That is, dimensions inside the first feature vector may remain identical as long as the neural network structure of the first feature extraction model remains unchanged.

The computing device may then input the first feature vector to the dimension prediction model, thereby obtaining a predicted dimension (S220). That is, in order to confirm whether the dimension of the first feature vector is sufficient for document classification, the predicted dimension (dimension necessary for document classification) may be obtained in advance.

Figure 11:
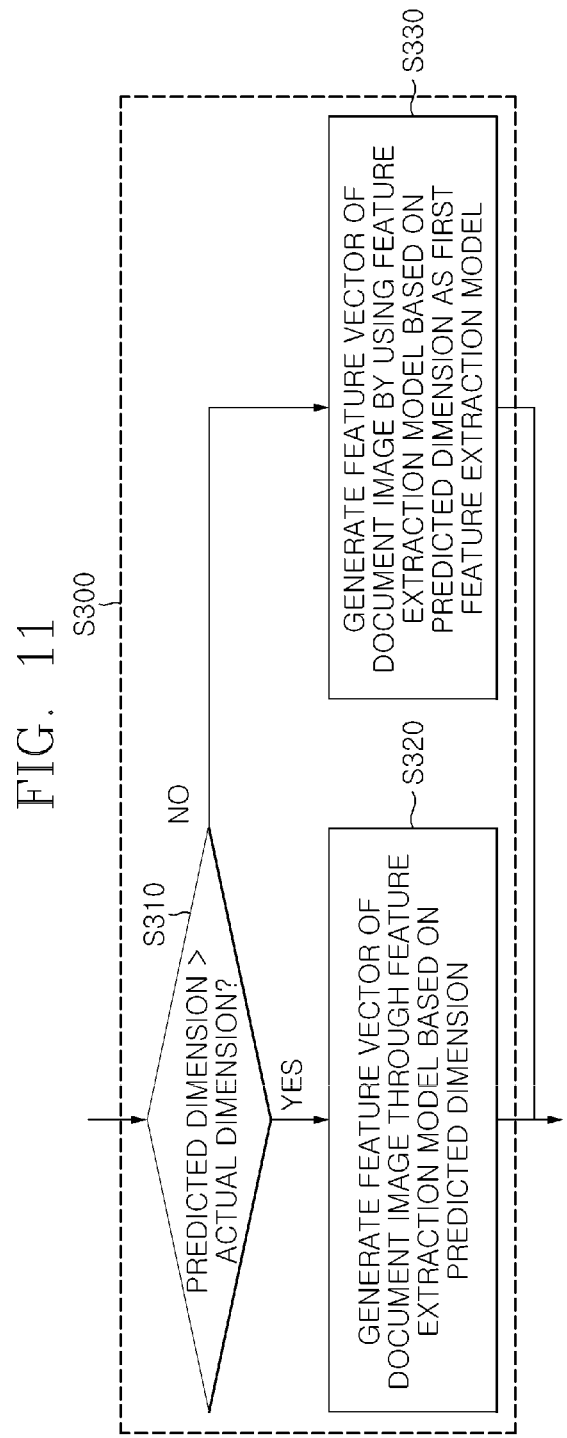
FIG. 11 is a flowchart illustrating a more detailed embodiment of generating a feature vector of a document image through a feature extraction model based on a predicted dimension (S300) in FIG. 7.

After calculating the predicted dimension, the computing device may generate a feature vector of the document image through a feature extraction model based on the predicted dimension (S300). Particularly, referring to FIG. 11, the predicted dimension and the actual dimension may be compared (S310). If the predicted dimension is larger than the actual dimension, it may be determined that the first feature vector is insufficient for document classification. If the predicted dimension and the actual dimension are identical, or if the actual dimension is larger, it may be determined that the first feature vector is sufficient for document classification.

Figure 12:
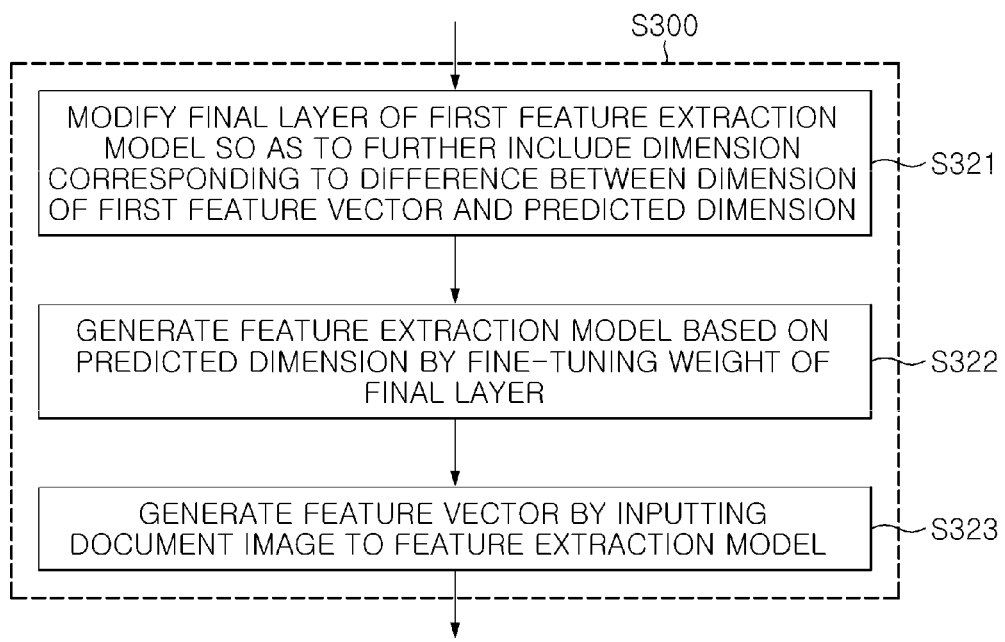
FIG. 12 is a flowchart illustrating an embodiment of generating a feature extraction model based on a predicted dimension.

Therefore, if the actual dimension included in the first feature vector is smaller than the predicted dimension, the computing device may generate a feature vector of the document image through a feature prediction model based on the predicted dimension, instead of the first feature extraction model (S320). The feature extraction model may be implemented as a neural network model (for example, CNN), and may be generated by modifying the first feature extraction model in some embodiments. Particularly, as illustrated in FIG. 12, the computing device may generate a feature extraction model. That is, the computing device may modify the final layer of the first feature extraction model such that the feature vector further includes a dimension corresponding to the difference between the dimension of the first feature vector and the predicted dimension (S321), and may generate a feature extraction model based on the predicted dimension by fine-tuning the weight of the final layer (S322). However, in some embodiments, it is also possible to fine-tune all layers without being limited to determining the weight through fine tuning related to the final layer.

After generating the feature extraction model, the document image may be input to the feature extraction model, thereby generating a feature vector having the predicted dimension (S323).

On the other hand, if the actual dimension included in the first feature vector is equal to or larger than the predicted dimension, the first feature extraction model may be used as a feature extraction model based on the predicted dimension, thereby generating a feature vector of the document image (S330). That is, since document classification is possible with the first feature vector, the existing first feature vector may be used to identify the document type without generating a separate feature extraction model.

The computing device may then identify the document type corresponding to the document image on the basis of the generated feature vector (S400). The computing device may identify the document type by inputting the feature vector to a document classification model, and the document classification model may be a clustering model.

Figure 13:
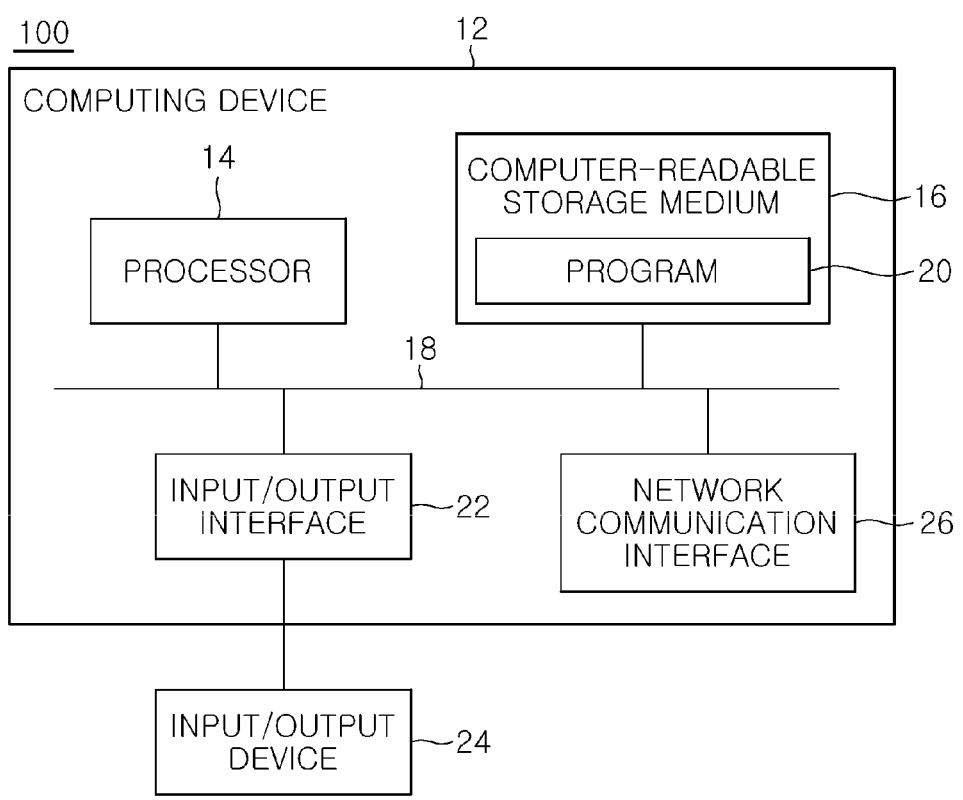
FIG. 13 illustrates an exemplary hardware configuration of a computing device by which methods according to various embodiments of the present disclosure can be implemented.

FIG. 13 is a block diagram illustrating a computing environment 10 which can be appropriately used in exemplary embodiments. In the illustrated embodiments, respective components may have different functions and abilities in addition to those described below, and the environment may include additional components addition to those described below.

The illustrated computing environment 10 includes a computing device 12. In an embodiment, the computing device 12 may be a device for document classification (for example, document classification device 100).

The computing device 12 includes at least one processor 14, a computer-readable storage medium 16, and a communication bus 18. The processor 14 may cause the computing device 12 to operate according to exemplary embodiments mentioned above. For example, the processor 14 may execute at least one program stored in the computer-readable storage medium 16. The at least one program may include at least one computer-executable command, and the computer-executable command may be configured such that, when executed by the processor 14, the same causes the computing device 12 to perform operations according to exemplary embodiments.

The computer-readable storage medium 16 is configured to store computer-executable commands or program codes, program data and/or other types of appropriate information. A program 20 stored in the computer-readable storage medium 16 includes a set of commands executable by the processor 14. In an embodiment, the computer-readable storage medium 16 may be a memory (a volatile memory such as a random access memory, a nonvolatile memory, or an appropriate combination thereof), at least one magnetic disk storage device, optical disk storage devices, flash memory devices, another type of storage medium which is accessed by the computing device 12, and which can store desired information, or an appropriate combination thereof.

The communication bus 18 interconnects various other components of the computing device 12, including the processor 14 and the computer-readable storage medium 16.

The computing device 12 may include at least one input/output interface 22 configured to provide an interface for at least one input/output device 24, and at least one network communication interface 26. The input/output interface 22 and the network communication interface 26 are connected to the communication bus 18. The input/output device 24 may be connected to other components of the computing device 12 through the input/output interface 22. Examples of the input/output device 24 may include a pointing device (mouse, trackpad, or the like), a keyboard, a touch input device (touchpad, touchscreen, or the like), a voice or sound input device, an input device such as various kinds of sensor devices and/or imaging devices, and/or an output device such as a display device, a printer, a speaker, and/or a network card. The exemplary input/output device 24 may be included in the computing device 12 as a component of the computing device 12, or may be connected to the computing device 12 as a separate device distinguished from the computing device 12.

The above-described present disclosure can be implemented as a computer-readable code in a medium in which a program is recorded. The computer-readable medium may continuously store a computer-executable program or may temporarily store the same for execution or download. In addition, the medium may be various types of recording means or storage means having a single piece or multiple pieces of hardware coupled thereto, and may exist distributed across networks without being limited to a medium directly connected to a specific computer system. Examples of the medium may include a magnetic medium such as a hard disk, a floppy disk, and a magnetic tape, an optical recording medium such as a CD-ROM and a DVD, a magneto-optical medium such as a floptical disk, a ROM, a RAM, a flash memory, and the like, and may be configured to store program commands. Other examples of the medium include recording mediums or storage mediums managed by an app store which distributes applications, a site which supplies or distributes various other kinds of software, a server, and the like. Therefore, above detailed descriptions are to be interpreted exemplary, not limiting in any aspect. The scope of the present disclosure is to be determined by reasonable interpretation of the accompanying claims, and encompasses all changed made within the equivalent scope of the present disclosure.

The present disclosure is not limited to the above-described embodiments and accompanying drawings. It will be obvious to those skilled in the art to which the present disclosure pertains that components according to the present disclosure can be substituted, modified, and changed without deviating from the technical idea of the present disclosure.

What is claimed is:

1. A document classification method performed by a processor inside a computing device, the document classification method comprising:
generating a first feature vector regarding a document image by inputting the document image to a first feature extraction model;
obtaining a predicted dimension which is a dimension of the first feature vector necessary to classify the document image that has been input, inputting the first feature vector to a learned dimension prediction model;
generating a second feature vector of the document image having the predicted dimension, by inputting the document image, to a second feature extraction model, if the dimension of the first feature vector is smaller than the predicted dimension; and
identifying a document type corresponding to the document image on the basis of the second feature vector,
wherein the generating of the second feature vector further comprises:
modifying a final layer of the first feature extraction model so as to further comprise a dimension corresponding to a difference between the dimension of the first feature vector and the predicted dimension; and
generating the second feature extraction model based on the predicted dimension by fine-tuning a weight of the final layer.

2. The document classification method of claim 1, wherein, if the dimension of the first feature vector is equal to or larger than the predicted dimension, identifying the document type corresponding to the document image on the basis of the first feature vector.

3. The document classification method of claim 1, wherein, in the identifying of the document type, a clustering model is used as a document classification model, and the second feature vector is input to the clustering model so as to identify the document type corresponding to the document image from a cluster comprising the second feature vector.

4. The document classification method of claim 1, further comprising learning and generating the dimension prediction model on the basis of a neural network model.

5. The document classification method of claim 4, wherein the generating of the dimension prediction model comprises:

inputting a learning data set comprising multiple learning images to the first feature extraction model, thereby generating learning vectors corresponding to the multiple learning images;

inputting the learning vectors to the dimension prediction model, thereby obtaining a predicted dimension which is a dimension of a learning vector necessary to classify learning images included in the learning data set; and learning so as to minimize loss of the predicted dimension and a labeled dimension, thereby generating the dimension prediction model.

6. The document classification method of claim 4, wherein the learning of the dimension prediction model comprises:

inputting a learning data set comprising multiple learning images to the first feature extraction model, thereby generating first learning vectors corresponding to the multiple learning images;

inputting the first learning vectors to the dimension prediction model, thereby obtaining a predicted dimension which is a dimension of a learning vector necessary to classify learning images included in the learning data set;

modifying the final layer of the first feature extraction model so as to generate the second feature vector having the predicted dimension, and generating the second feature extraction model by fine-tuning weights of the final layer;

inputting the learning data set to the second feature extraction model, thereby generating multiple second learning vectors;

inputting the second learning vectors to a clustering model, thereby classifying the second learning vectors into multiple clusters, and obtaining a predicted cluster number which is a number of the classified clusters; and learning so as to minimize loss of the predicted cluster number and a labeled cluster number of the learning data set, thereby generating the dimension prediction model.

7. A non-transitory computer-readable storage medium storing commands which, when executed by a processor, cause a device comprising the processor to perform document classification operations comprising:

generating a first feature vector regarding a document image by inputting the document image to a first feature extraction model;

obtaining a predicted dimension which is a dimension of the first feature vector necessary to classify the document image that has been input, by inputting the first feature vector to a learned dimension prediction model;

generating a second feature vector of the document image-having the predicted dimension, by inputting the document image, to a second feature extraction model, if the dimension of the first feature vector is smaller than on the predicted dimension; and identifying a document type corresponding to the document image on the basis of the second feature vector wherein the generating of the second feature vector further comprises:

modifying a final layer of the first feature extraction model so as to further comprise a dimension corresponding to a difference between the dimension of the first feature vector and the predicted dimension; and generating the second feature extraction model based on the predicted dimension by fine-tuning a weight of the final layer.

8. A document classification device comprising a processor configured to perform:

generating a first feature vector regarding a document image by inputting the document image to a first feature extraction model;

obtaining a predicted dimension which is a dimension of the first feature vector necessary to classify the document image that has been input, by inputting the first feature vector to a learned dimension prediction model;

generating a second feature vector of the document image having the predicted dimension, by inputting the document image, to a second feature extraction model, if the dimension of the first feature vector is smaller than the predicted dimension; and identifying a document type corresponding to the document image on the basis of the second feature vector, wherein the generating of the second feature vector further comprises:

modifying a final layer of the first feature extraction model so as to further comprise a dimension corresponding to a difference between the dimension of the first feature vector and the predicted dimension; and generating the second feature extraction model based on the predicted dimension by fine-tuning a weight of the final layer.

9. The document classification device of claim 8, wherein, if the dimension of the first feature vector is equal to or larger than the predicted dimension, identifying the document type corresponding to the document image on the basis of the first feature.

10. The document classification device of claim 8, wherein, in the identifying of the document type, a clustering model is used as a document classification model, and the second feature vector is input to the clustering model so as to identify the document type corresponding to the document image from a cluster comprising the second feature vector.

11. The document classification device of claim 8, further comprising learning and generating the dimension prediction model on the basis of a neural network model.

12. The document classification device of claim 11, wherein the generating of the dimension prediction model comprises:

inputting a learning data set comprising multiple learning images to the first feature extraction model, thereby generating learning vectors corresponding to the multiple learning images;

inputting the learning vectors to the dimension prediction model, thereby obtaining a predicted dimension which is a dimension of a learning vector necessary to classify learning images included in the learning data set; and learning so as to minimize loss of the predicted dimension and a labeled dimension, thereby generating the dimension prediction model.

13. The document classification device of claim 11, wherein the generating of the dimension prediction model comprises:

inputting a learning data set comprising multiple learning images to the first feature extraction model, thereby generating first learning vectors corresponding to the multiple learning images;

inputting the first learning vectors to the dimension prediction model, thereby obtaining a predicted dimension which is a dimension of a learning vector necessary to classify learning images included in the learning data set;

modifying the final layer of the first feature extraction model so as to generate the second feature vector having the predicted dimension, and generating the second feature extraction model by fine-tuning weights of the final layer;

inputting the learning data set to the second feature extraction model, thereby generating multiple second learning vectors;

inputting the second learning vectors to a clustering model, thereby classifying the second learning vectors into multiple clusters, and obtaining a predicted cluster number which is a number of the classified clusters; and learning so as to minimize loss of the predicted cluster number and a labeled cluster number of the learning data set, thereby generating the dimension prediction model.

\* \* \* \* \*